United States Patent [19]
De La Mare et al.

[11] 4,359,370
[45] Nov. 16, 1982

[54] CURABLE EPOXY-VINYL ESTER COMPOSITIONS

[75] Inventors: Harold E. De La Mare; Paul D. Jones, both of Houston, Tex.

[73] Assignee: Shell Oil Company, Houston, Tex.

[21] Appl. No.: 209,626

[22] Filed: Nov. 24, 1980

[51] Int. Cl.³ .............. C08G 59/40; C08G 59/42; B03B 5/60
[52] U.S. Cl. .............. 204/159.15; 528/112
[58] Field of Search ............. 204/159.14, 159.15, 204/13; 528/112

[56] References Cited

U.S. PATENT DOCUMENTS

| | | | |
|---|---|---|---|
| 2,633,458 | 3/1953 | Shokal | 260/452 |
| 3,336,241 | 8/1967 | Shokal | 260/2 |
| 3,356,624 | 12/1967 | Neal et al. | 260/18 |
| 3,377,406 | 4/1968 | Newey et al. | 260/837 |
| 3,408,219 | 10/1968 | Neal et al. | 117/37 |
| 3,418,333 | 12/1968 | Warren | 260/309 |
| 3,446,762 | 5/1969 | Lopez et al. | 260/18 |
| 3,637,618 | 1/1972 | May | 260/837 R |
| 3,756,984 | 9/1973 | Klaren et al. | 260/47 EC |
| 4,146,452 | 3/1979 | Weber et al. | 204/159.14 |

*Primary Examiner*—Theodore Morris
*Attorney, Agent, or Firm*—Norris E. Faringer

[57] ABSTRACT

Partial vinyl-epoxy ester compositions are disclosed which can be cured by a dual path comprising exposure to UV radiation followed by a post thermal treatment. Simply, the partial esters contain from about 1 to 10 parts per hundred parts by weight of ester of a catalyst compound such as tertiary amines and imidazole compounds, salts and adducts thereof.

6 Claims, No Drawings

CURABLE EPOXY-VINYL ESTER COMPOSITIONS

BACKGROUND OF THE INVENTION

The preparation of vinyl esters by reacting epoxy compounds with ethylenically unsaturated monocarboxylic acids, particularly in the presence of an esterification catalyst, e.g., an onium salt, is well known. See, for example, U.S. Pat. No. 3,377,406. Generally, such polyethylenically unsaturated polyesters (vinyl esters) are prepared by reacting a diglycidyl polyether of a dihydric phenol with two moles of an ethylenically unsaturated acid, such as acrylic or methacrylic acid, in the presence of an onium salt such as tetramethylammonium chloride. The resulting polyester has the general formula

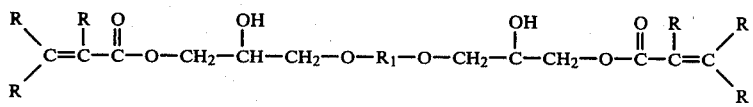

wherein each R is a hydrogen or an alkyl radical such as methyl and $R_1$ is an aromatic radical, preferably a

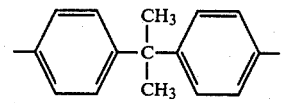

radical. Such vinyl esters are essentially full esters, i.e., free of epoxy groups, and may be blended with ethylenically unsaturated monomers such as styrene. The neat resin or the blend may be subsequently cured with peroxides to form products having excellent properties. However, these full esters sometimes exhibit viscosities which are too high, which limits their use. If, on the other hand partial esters are produced, the resulting partial esters exhibit lower viscosity but also exhibit poor shelf life. It will be appreciated that partial esters are produced by reacting the epoxy compound with less than the stoichiometric amount of the ethylenically unsaturated monocarboxylic acid, generally from about 50% to 85% of the stoichiometric amount of acid. It will be further appreciated that the resulting partial ester contains both epoxy and vinyl groups, or, more accurately, will be a blend of resins comprising resins having two terminal epoxy groups; two terminal vinyl groups; and one terminal epoxy group and one terminal vinyl group.

It has now been found that these partial vinyl esters (epoxyvinyl esters) can be stabilized and cured by a special dual path technique. Simply, excellent shelf life, even at 60° C., and excellent curability can be achieved by such dual path approach wherein the curable composition is exposed to UV radiation followed by a post thermal treatment.

SUMMARY OF THE INVENTION

The present invention provides a heat curable, tack-free composition comprising (1) a partial vinyl ester prepared by reacting from 0.50 to about 0.85 chemical equivalents of an ethylenically unsaturated monocarboxylic acid with a chemical equivalent of an epoxy compound containing more than one vicinal epoxy group, and most preferably a diglycidyl ether of a dihydric phenol, and (2) a catalytic amount of a compound which is soluble in the resin selected from the group consisting of tertiary amines and salts thereof, imidazole and substituted-imidazole compounds, benzimidazole and substituted-benzimidazole compounds, and epoxy adducts of said imidazole and benzimidazole compounds, said blend being exposed to UV radiation of such strength and time to effect a tack-free partial cure, i.e., a so-called "B-stage". The "B-staged" composition may be subsequently heated to effect the desired cure to produce coatings exhibiting excellent physical and chemical properties.

DESCRIPTION OF THE PREFERRED EMBODIMENT

The partial vinyl esters suitable for use in the present compositions comprise the vinyl esters prepared by partially esterifying a polyepoxide, preferably a glycidyl polyether of a polyhydric phenol, with at least one ethylenically unsaturated carboxylic acid, particularly a monocarboxylic acid, preferably in the presence of an esterification catalyst.

The polyepoxides used to prepare the partial vinyl ester compositions comprise those compounds containing at least one vicinal epoxy or oxirane group, i.e., at least one

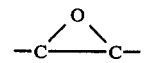

group. These polyepoxides may be saturated or unsaturated, aliphatic, cycloaliphatic, aromatic or heterocyclic and may be substituted if desired with non-interfering substitutents such as halogen atoms, hydroxyl groups, ether radicals, and the like. They may also be monomeric or polymeric.

For clarity, many of the polyepoxides and particularly those of the polymeric type are described in terms of epoxy equivalent values. The meanings of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. Nos. 3,356,624, 3,408,219, 3,446,762 and 3,637,618 and so much of the disclosure relevant to examples of epoxy compounds is incorporated by reference into this specification.

Preferred polyepoxides are the glycidyl polyethers of polyhydric phenols and polyhydric alcohols, especially the glycidyl polyethers of 2,2bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

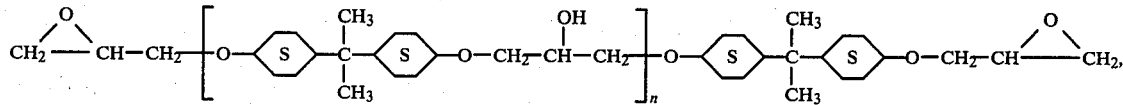

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2 2-bis(4-cyclohexanol)propane.

The organic unsaturated carboxylic acid used to partially esterify the polyepoxide may be aliphatic, cycloaliphatic or aromatic and may be monocarboxylic or polycarboxylic.

Particularly preferred acids to be utilized comprise the ethylenically unsaturated acids such as, for example, acrylic acid, methacrylic acid, crotonic acid, alpha-phenylacrylic acid, alpha-cyclohexylacrylic acid, maleic acid, alpha-chloromaleic acid, tetrahydrophthalic acid, itaconic acid, citraconic, fumaric acid, cyanoacrylic acid, methoxyacrylic acid, and the like.

Also preferred are the partial esters of polycarboxylic acids, and particularly the alkyl, alkenyl, cycloalkyl and cycloalkenyl esters of polycarboxylic acids such as for example, allyl hydrogen maleate, butyl hydrogen maleate, allyl hydrogen phthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

An esterification catalyst is not required, however, the use of such a catalyst is highly desired. In general, any esterification catalyst is suitable for use to prepare vinyl esters including the metal hydroxides such as sodium hydroxide; tin salts such as stannous octoate; phosphines such as triphenyl phosphine; the onium salts such as the phosphonium salts, including the phosphonium and ammonium halides.

Preferred esterification catalysts comprise the onium salts, and preferably those containing phosphorus, sulfur or nitrogen, such as, for example, the phosphonium, sulfonium and ammonium salts of inorganic acids. Examples of these include, among others, benzyltrimethylammonium sulfate, tetramethylammonium chloride, benzyltrimethylammonium sulfate, tetramethylammonium chloride, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium chloride, dicyclohexyldialkylphosphonium iodide, benzyltrimethylammonium thiocyanate, and the like, and mixtures thereof.

Preferred onium salts to be employed include those of the formula:

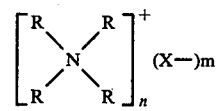

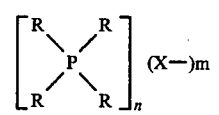

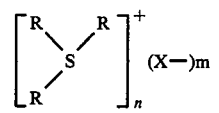

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, m is the valency of the X ion and n=m.

The preparation of suitable vinyl esters is well known. See, for example, U.S. Pat. No. 3,377,406, describing a very suitable process for preparing vinyl esters. Accordingly, the disclosure relevant to the preparation of partial vinyl esters is hereby incorporated and made a part of the instant specification.

The amount of above-noted polyepoxide and acids will vary within limits. In general, suitable partial vinyl esters (epoxy-vinyl esters) will be produced if one chemical equivalent of polyepoxide is reacted with from about 0.35 to about 0.95 chemical equivalents of the acid, and preferably from about 0.5 to about 0.8. As used herein and in the appended claims, a chemical equivalent amount of polyepoxide refers to that amount which furnishes one epoxy group and a chemical equivalent amount of acid refers to that amount which furnishes one carboxyl group.

The amount of the catalyst employed may also vary over a considerable range. In general, the amount of the catalyst will vary from about 0.01% to about 3% by weight, and more preferably from 0.1% to 2% by weight of the reactants.

The esterification reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for sometime after its formation, it may also be desirable to remove the catalyst used in the preparation, such as by stripping, neutralization and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.015 eq/100 grams or below.

The process for preparing the partial vinyl esters may be effected in any suitable manner. The preferred method merely comprises adding the polyepoxide, acid, catalyst, and solvent or diluent if desired, in any order and then applying the necessary heat to bring about the reaction. The reaction mixture may then be distilled or stripped to remove any of the unnecessary components, such as solvent, catalyst, excess reactants and the like.

Of course, many other additives and/or process modifications known to those skilled in the art may be employed as desired. For example, free radical inhibitors and stabilizers such as hydroquinone, monomethyl hydroquinone, phenothiazene, dialkyl hydroxylamines (e.g., diethyl hydroxylamine), trialkylphosphites, maleic anhydride, and the like may be added during the esterification and/or to the vinyl ester product. Also, the use of air/$N_2$ mixtures may be employed during the esterification step to inhibit vinyl polymerization.

The polyester products obtained by the above process will vary from liquids to solid resins. The products will possess a plurality of free OH groups and both epoxide and ethylenic groups. The products will be of higher molecular weight than the basic polyepoxide from which they are formed.

The partial vinyl esters may be mixed or blended with one or more compatible unsaturated monomers for some uses. The blends of partial vinyl esters are generally preferred. If a comonomer is employed, it is generally useful to use only that amount required to give a good application viscosity. The amount of unsaturated comonomer will generally be less than 40% of the total partial vinyl ester/comonomer blend.

Examples of such comonomers include, among others, aromatic compounds such as styrene, alpha-methylstyrene, dichlorostyrene, vinyl naphthalene, vinyl phenol and the like, unsaturated esters, such as acrylic and methacrylic esters, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl mateate, divinyl adipate, dichloroallyl tetrahydrophthalate, and the like, and mixtures thereof.

Especially preferred unsaturated comonomers are the aromatic unsaturated compounds such as styrene, vinyl toluene and divinyl benzene.

To the above partial vinyl ester or ester/comonomer blends is added a "catalytic" amount of selected curing agents. The term "catalytic" is used herein to designate relatively small amounts of the curing agent compounds, i.e., less than the customarily amounts employed as curing agents. In any event, these curing compounds are employed in amounts from about 0.5 to about 15 parts by weight (phr) of curing compound to 100 parts by weight of the total resin blend; preferably from about 1 to 10 phr and more preferably from about 1 to 5 phr.

Suitable curing compounds useful in the present vinyl ester compositions include the tertiary amines; imidazole and substituted compounds as well as their adducts; benzimidazole and substituted benzimidazole compounds as well as their adducts and dicyamdiamide.

Suitable tertiary amines have the general formula

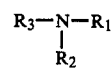

wherein $R_1$, $R_2$ and $R_3$ each represent an alkyl, aryl, or alkaryl radical of up to about 10 carbon atoms. Examples of suitable tertiary amines include, among others, trimethylamine, triethylamine, triisopropylamine, diethylmethylamine, benzyldimethylamine, alpha-methylbenzyl dimethylamine, dimethylaminomethylphenol (DMP-10), tridimethylaminomethylphenol (DMP-30).

Suitable tertiary amine salts are the organic salts of said tertiary amines, particularly the triacetate and tribenzoate salts of the amine such as DMP-30. A very effective tertiary amine salt is the tri-2-ethylhexanote salt of DMP-30. Other suitable tertiary amine salts include the acetates, chloroacetates, methane sulfonates and p-toluene sulfonates of N,N'-triethylenediamine

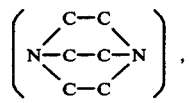

2,5-dimethyl-2,5-hexanediamine

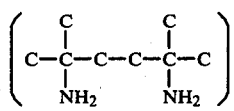

and other aliphatic and cycloaliphatic di-tertiary amine salts. Secondary amine adducts with epoxy resins may also be employed in the form of their salts.

Still other curing compounds include the heterocyclic compounds possessing in the heterocyclic ring (1) a substituted C=N—C group and (2) a secondary amino group, i.e., an =N—H group. Preferred examples of these heterocyclic compounds include, among others, the imidazoles, substituted imidazoles, benzimidazoles, substituted benzimidazoles having the structural formula

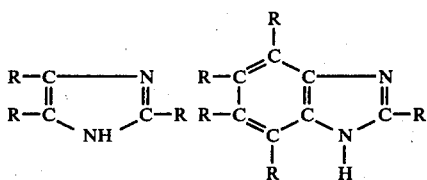

respectfully, wherein R is selected from hydrogen atoms, halogen atoms, or an organic radical such as a hydrocarbon radical or a substituted hydrocarbon radical, for example, the ester, ether, amide, amino, halogen, or mercapto substituted hydrocarbon radicals.

Especially preferred imidazoles are those wherein the substituent is hydrogen or a hydrocarbon radical, and preferably an alkyl, alkenyl, cycloalkyl, cycloalkenyl, aryl, alkaryl or arylalkyl radicals, and particularly those containing no more than 15 carbon atoms.

Also included are the salts of the above named imidazoles and benzimidazoles, preferably the salts of monocarboxylic acids having from 1 to 8 carbon atoms, lactic acid and phosphoric acid.

The above-described imidazole salts can be prepared by reacting the imidazole with the acid to form the corresponding amine salt. The imidazoles are prepared by conventional techniques of reacting a dialdehyde with ammonia and formaldehyde. The salts are preferably prepared by mixing the desired acid with imidazole and maintaining the temperature between 23° and 100° C. Solvents are not necessary but may be employed if desired. One should use at least one gram molecular weight of acid or if desired, one should use a larger ratio, i.e., up to a 2:1 ratio of acid to imidazole. The higher the acid level, the more stable the resin-catalyst mixture. The reaction is preferably accomplished at temperatures between 23° C. and 150° C. As heat is evolved in the reaction, cooling means may be needed to keep the temperature in the desired range.

A more detailed description of the chemistry of the imidazoles and benzimidazoles including their properties and structural formulas is found in the book by Klaus Hofmann Science Publishers, Inc., New York (1953). Examples of imidazole salts include, among others, the acetate, formate, lactate, and phosphate salts of imidazole, benzimidazole, and substituted imidazoles. Examples of suitable substituted imidazoles include 2-methylimidazole; 2-ethyl-4-methylimidazole; 2-cyclohexyl-4-imidazole; 2-carboethoxybutyl-4-methylimidazole; 2-octyl-4-hexylimidazole; 2-methyl-5-ethylimidazole; 2-ethyl-4-phenylimidazole; 2-amide-5-ethylimidazole; 2-ethyl-4-(2-ethylamino)-5-methylimidazole; 2,5-chloro-4-ethylimidazole; and mixtures thereof. Especially preferred are the alkyl-substituted imidazole acetates and lactates wherein the alkyl groups contain not more than 8 carbon atoms. Preferred are 2-ethyl-4-methylimidazole acetate, 2-ethyl-4-methylimidazole lactate, 2-methylimidazole acetate, 2-methylimidazole lactate, imidazole acetate, imidazole lactate, and mixtures thereof.

Suitable imidazole and benzimidazole compounds and the preparation of their respective salts is described in detail in U.S. Pat. No. 3,418,333, and so much of the disclosure relevant to said compounds, their salts and their preparation is incorporated herein by reference.

Also included as curing compounds are the epoxyimidazole and epoxy-benzimidazole adducts. The preparation of such adducts form no part of the present invention. Operable epoxy adducts and their preparation is described in U.S. Pat. No. 3,756,984, and that portion directed to the preparation of epoxy adducts is herein incorporated by reference.

The present compositions are simply prepared by mixing the curing catalyst with the partial vinyl ester, or ester/comonomer blend.

Of course, other materials may be mixed or added, including, plasticizers, stabilizers, extenders, oils, resins, tars, asphalts, pigments. reinforcing agents, thioxotropic agents, antioxidants.

The present compositions may be utilized in many applications such as for coatings and impregnating compositions in the preparation of adhesives for metals, wood, cement and the like, and in the preparation of reinforced composite products, such as laminated products, filament windings, sheet molding compounds (SMC), electrical laminates, molding powders, fluidized bed powders, potting compounds, etc. A very suitable application is in the preparation of reinforced products and laminates wherein the compositions are applied to fibrous products such as glass fibers or sheets and the material formed into the desired object and then exposed to UV radiation and post cured via baking.

The composition is then exposed to UV radiation of such strength and time interval as to "B-stage" or partially cure the composition, i.e., to a "tack-free" form. In general, the UV radiation will have major peaks in the range from about 200 nm to about 578 nm and exposure time will vary from about 0.001 seconds to about 2.5 seconds, preferably about 0.01 seconds to 0.6 seconds. (The abbreviation "nm" is nanometers.)

The composition can be exposed to the UV radiation as a neat composition or the composition can be mixed with reinforcement materials, applied to a substrate, or the like before exposure to the UV radiation.

After such exposure, the tack free composition is stable for >>30 days at a temperature of 25° C.

The resulting tack free composition may be subsequently cured at about 100° C. to about 225° C. at from about 5 minutes to about 60 minutes.

The following example is given to illustrate the preparation of the instant heat-curable partial ester compositions. It is understood that the example is an embodiment only and is given for the purpose of illustration and the invention is not to be regarded as limited to any specific components and/or specific conditions recited therein. Unless otherwise indicated, parts and percentages in the example, are parts and percentages by weight.

Epoxy Resin A is a liquid glycidyl polyether of 2,2-bis(4-hydroxyphenyl)propane having an epoxide equivalent weight of 175–190 and an average molecular weight of about 350.

Vinyl Ester Resin A is an unsaturated vinyl ester prepared by reacting 1 mole of Polyether A with 1 mole of acrylic acid.

Control Composition A contained the following components (by weight):

| Vinyl Ester Resin A | 70 |
| Hexanediol diacrylate (HDODA) | 30 |
| Photoiniatiator (Triganol ® 14) | 3 |

Curing Agent X is an epoxy-imidazole adduct prepared by reacting Polyether A with 2-methyl imidazole.

The test methods are as follows:

MEK Rubs—Number of double rubs required to break through the film with a Kim-wipe or other paper tissue wet with methyl ethyl ketone (MEK).

Pencil Hardness—ASTM D3363-74.

Adhesion—Cross hatch scribe/Cellulose tape (Scotch ®) as in ASTM 3359.

Reverse Impact—ASTM D-2794; using a Gardner Coverall Bend and Impact Tester. Impact on back or reverse side of panel.

Conical Mandrel—ASTM D-522; using a standard conical mandrel as in ASTM D-522. Simply measured "inches of crack" from the apex of cone.

EXAMPLE I

Bonderite ® 100-treated steel panels were coated with Control Composition A and with Control Composition A plus 3 phr (parts per hundred by weight of Control Composition A) of Curing Agent X. The panels were then exposed to ultraviolet radiation at 125 feet/minute/lamp (200 watt/inch) and to radiation plus a post bake at various times and temperatures. The data summarizing the improvement exhibited by the dual path approach is tabulated in Table I. All film properties determined as average of duplicates.

TABLE I

| Composition | Treatment | MEK Rubs | Hardness | Adhesion | Rev. Imp. | Con. Mand. |
|---|---|---|---|---|---|---|
| Control Composition A | UV | 28 | 4H | 2 | 28 | F¼ |
| Control Composition A + 3 phr of Curing Agent X | UV | 24 | 4H | 6.5 | 36 | F⅛ |
| Control Composition A | UV + 5'/250° F. (121° C.) | 27 | 6H | 4.5 | 44 | F-1/16 |
| Control Composition A + 3 phr of Curing Agent X | UV + 5'/250° F. (121° C.) | 47 | 5H | 8.5 | 18 | F⅛ |
| Control Composition A | UV + 20'/250° F. (121° C.) | 53 | 5H | 8 | 34 | F-3/16 |
| Control Composition A + 3 phr of Curing Agent X | UV + 20'/250° F. (121° C.) | >100 | 5H | 10 | ~10 | F½ |
| Control Composition A | UV + 5'/400° F. (204° C.) | 67 | 5H | 9 | 38 | F⅛ |
| Control Composition A + 3 phr of Curing Agent X | UV + 5'/400° F. (204° C.) | >100 | 5H | 10 | 40 | F⅜ |

What is claimed is:

1. A heat-curable, tack free composition exhibiting excellent shelf life consisting essentially of (1) a partial vinyl ester containing hydroxyl groups prepared by reacting from about 0.50 to about 0.85 chemical equivalents of an ethylenically unsaturated monocarboxylic acid with a chemical equivalent amount of an epoxy compound containing more than one vicinal-epoxy group and (2) a catalytic amount of an adduct of an imidazole compound and a glycidyl ether of 2,2-bis(4-hydroxyphenyl)propane, said blend being exposed to UV radiation in an amount to effect a tack-free, B-stage partial cure.

2. The composition of claim 1 wherein the epoxy compound is a glycidyl ether of a polyhydric phenol.

3. The composition of claim 2 wherein the epoxy compound is the diglycidyl ether of 2,2-bis(4-hydroxyphenyl)propane.

4. The composition of claim 1 wherein the ethylenically unsaturated monocarboxylic acid is acrylic or methacrylic acid.

5. The composition of claim 1 wherein the catalyst compound is an adduct of 2-methylimidazole and a diglycidyl ether of 2,2-bis(4-hydroxyphenyl)propane.

6. A cured composition prepared by heating the composition of claim 1 at about 100° C. to about 225° C. for about 5 minutes to about 60 minutes.

* * * * *